US007494330B2

(12) United States Patent
Good et al.

(10) Patent No.: US 7,494,330 B2
(45) Date of Patent: Feb. 24, 2009

(54) DEVICE TO RECEIVE TOOLS FOR THE CALIBRATION OF WORKPIECES AND PRESS WITH SUCH A DEVICE

(75) Inventors: Hermann Good, Bucha SG (CH); Peter Rauch, Feldkirch-Tisis (AT)

(73) Assignee: Alvier AG PM-Technology, Buchs (CH)

( * ) Notice: Subject to any disclaimer, the term of this patent is extended or adjusted under 35 U.S.C. 154(b) by 477 days.

(21) Appl. No.: 10/577,249

(22) PCT Filed: Oct. 28, 2004

(86) PCT No.: PCT/CH2004/000650

§ 371 (c)(1),
(2), (4) Date: Apr. 26, 2006

(87) PCT Pub. No.: WO2005/039805

PCT Pub. Date: May 6, 2005

(65) Prior Publication Data

US 2007/0062244 A1 Mar. 22, 2007

(30) Foreign Application Priority Data

Oct. 29, 2003 (CH) .................................... 1841/03

(51) Int. Cl.
*B29C 43/20* (2006.01)

(52) U.S. Cl. ......................... 425/78; 425/195; 425/352; 425/356

(58) Field of Classification Search ................... 425/78, 425/193, 195, 352, 354–356
See application file for complete search history.

(56) References Cited

U.S. PATENT DOCUMENTS

| | | | | |
|---|---|---|---|---|
| 3,611,498 A | | 10/1971 | Hedin | |
| 3,771,930 A | | 11/1973 | Ginzel et al. | |
| 5,366,363 A | | 11/1994 | Good et al. | |
| 5,551,856 A | * | 9/1996 | Katagiri | 425/78 |

FOREIGN PATENT DOCUMENTS

| | | |
|---|---|---|
| DE | 1938490 | 4/1970 |
| DE | 1920969 | 11/1970 |
| DE | 9012752.8 | 11/1990 |
| EP | 0528761 | 2/1993 |

OTHER PUBLICATIONS

International Search Report for PCT/CH2004/000650, dated Aug. 26, 2005.

* cited by examiner

*Primary Examiner*—Yogendra Gupta
*Assistant Examiner*—Thu Khanh T Nguyen
(74) *Attorney, Agent, or Firm*—Nixon & Vanderhye P.C.

(57) ABSTRACT

The device serves to receive a tool for calibrating of workpieces (83), preferably workpieces manufactured by a powder metallurgical process. On the example shown the tool comprises the lower stamps (77, 78, 79) and the upper stamps (80, 81, 82) located on tool supports (31, 32, 33; 31', 32', 33'). These stamps may be moved up and down individually or together parallel to the axis (40). Also movable up and down is the tool support (41) on which, if required, a center pin (85) is mounted. The device is particularly suitable for the calibration of complicated workpieces, such as represented for example by the workpiece (83) having the form of a body of rotation.

18 Claims, 5 Drawing Sheets

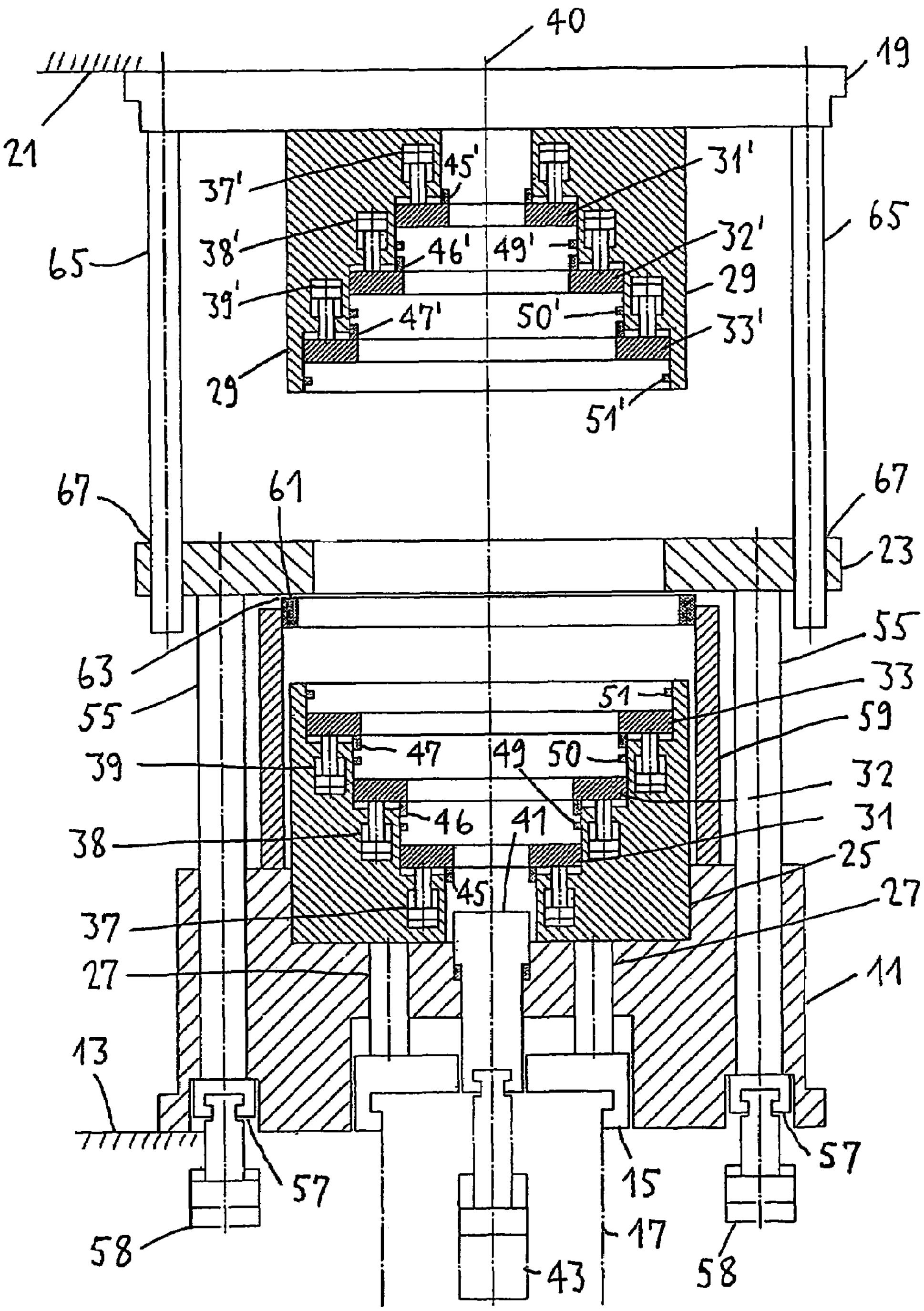
FIG..1

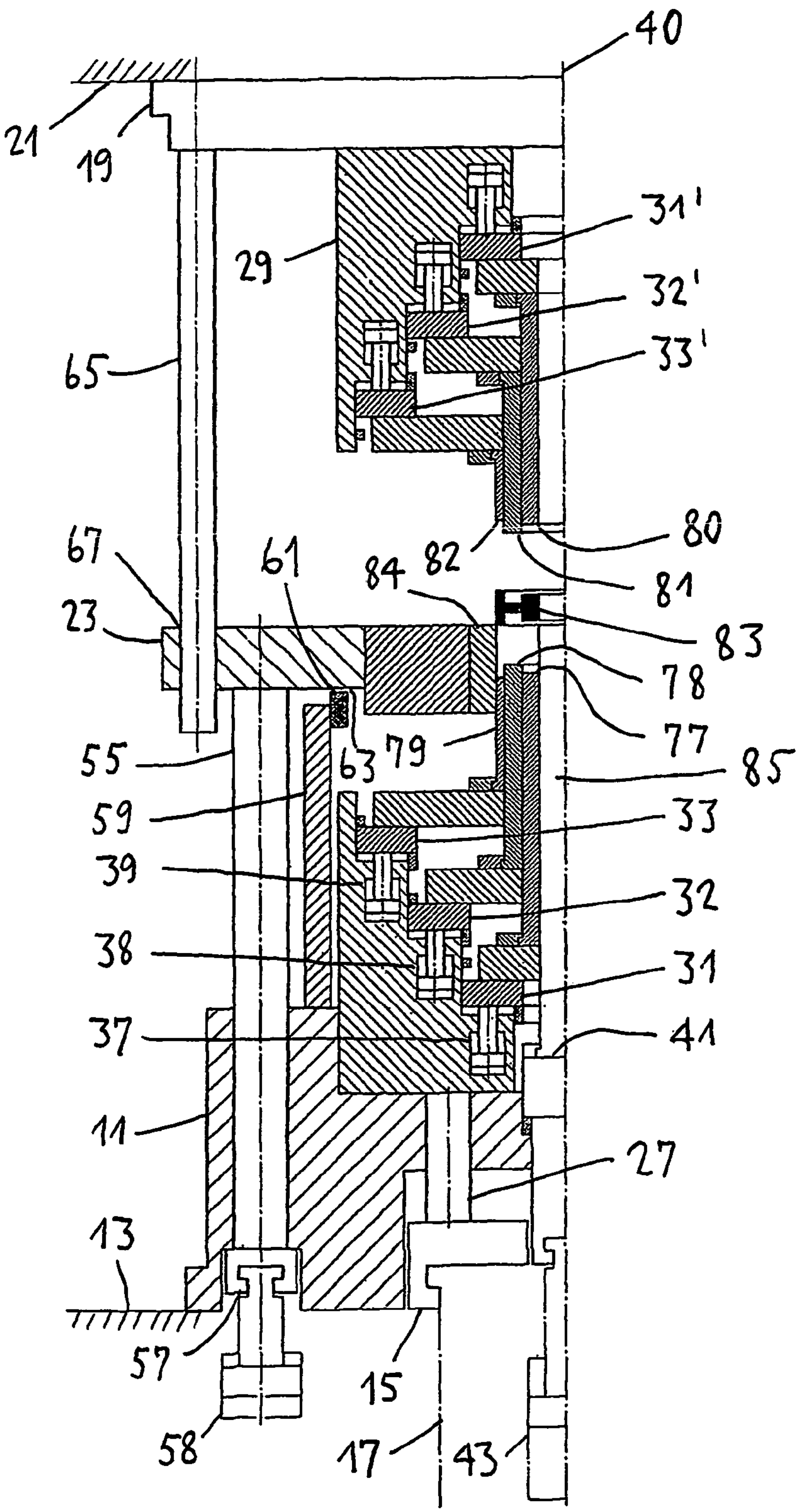
FIG..2

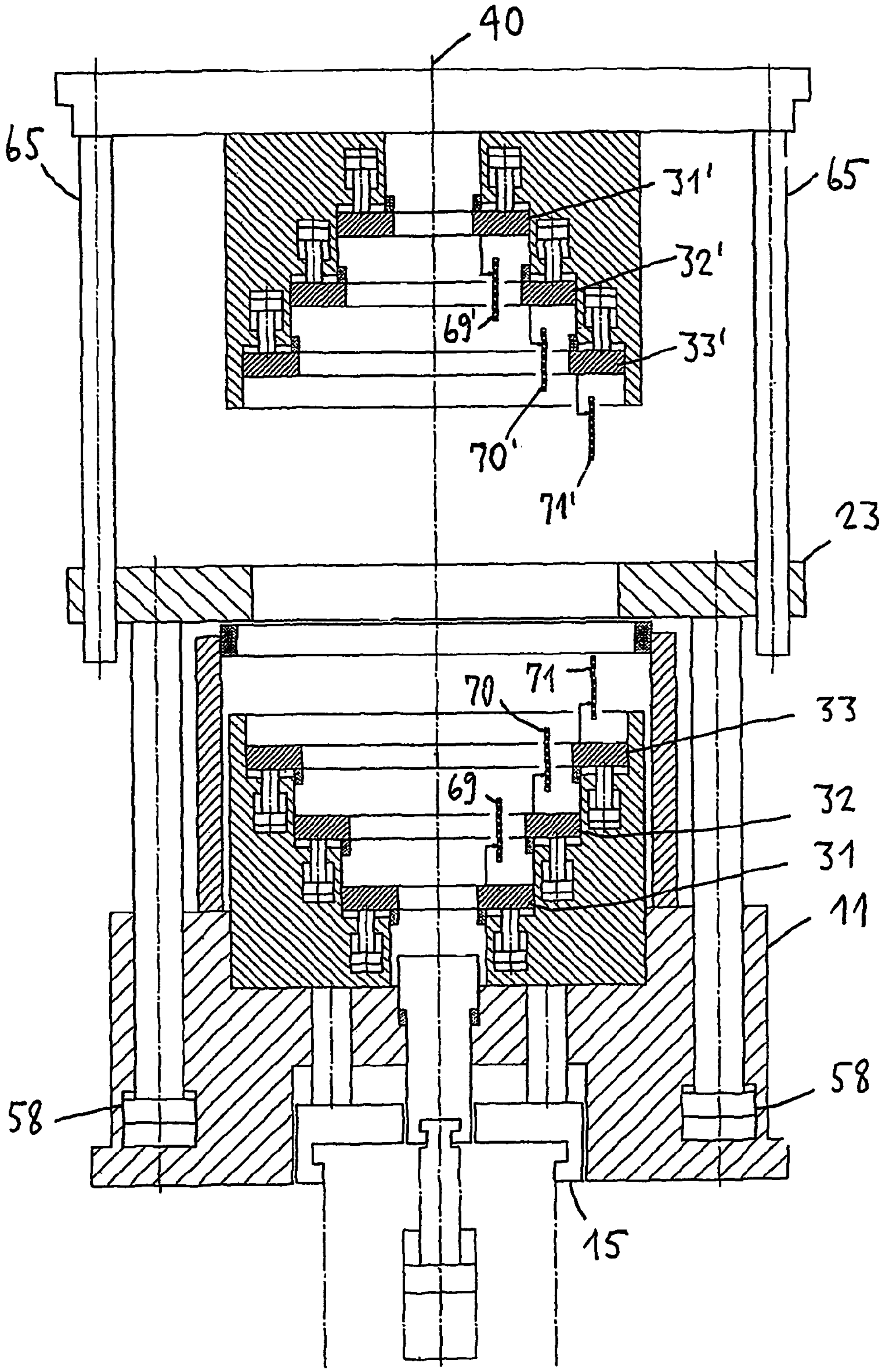
FIG..3

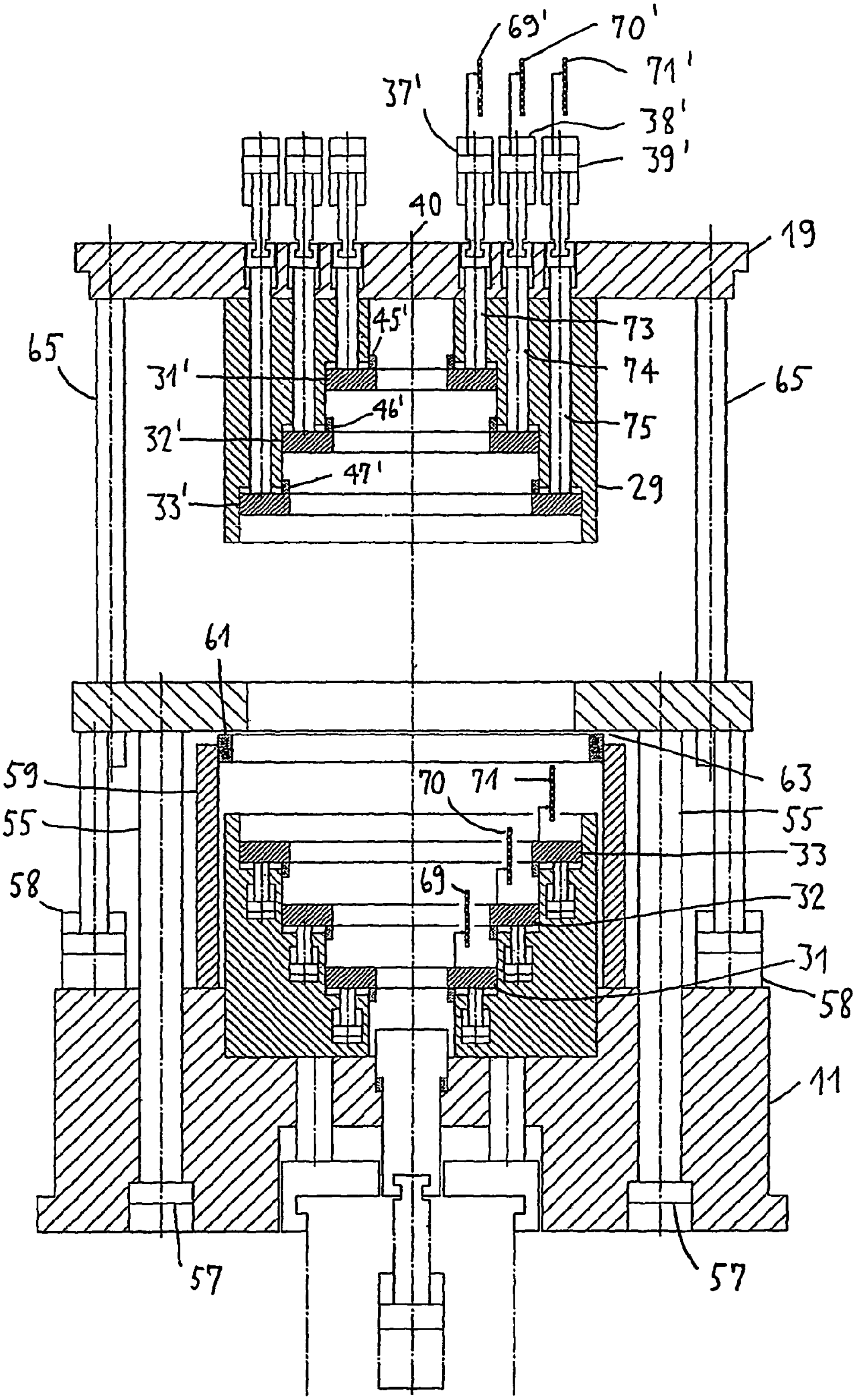
FIG..4

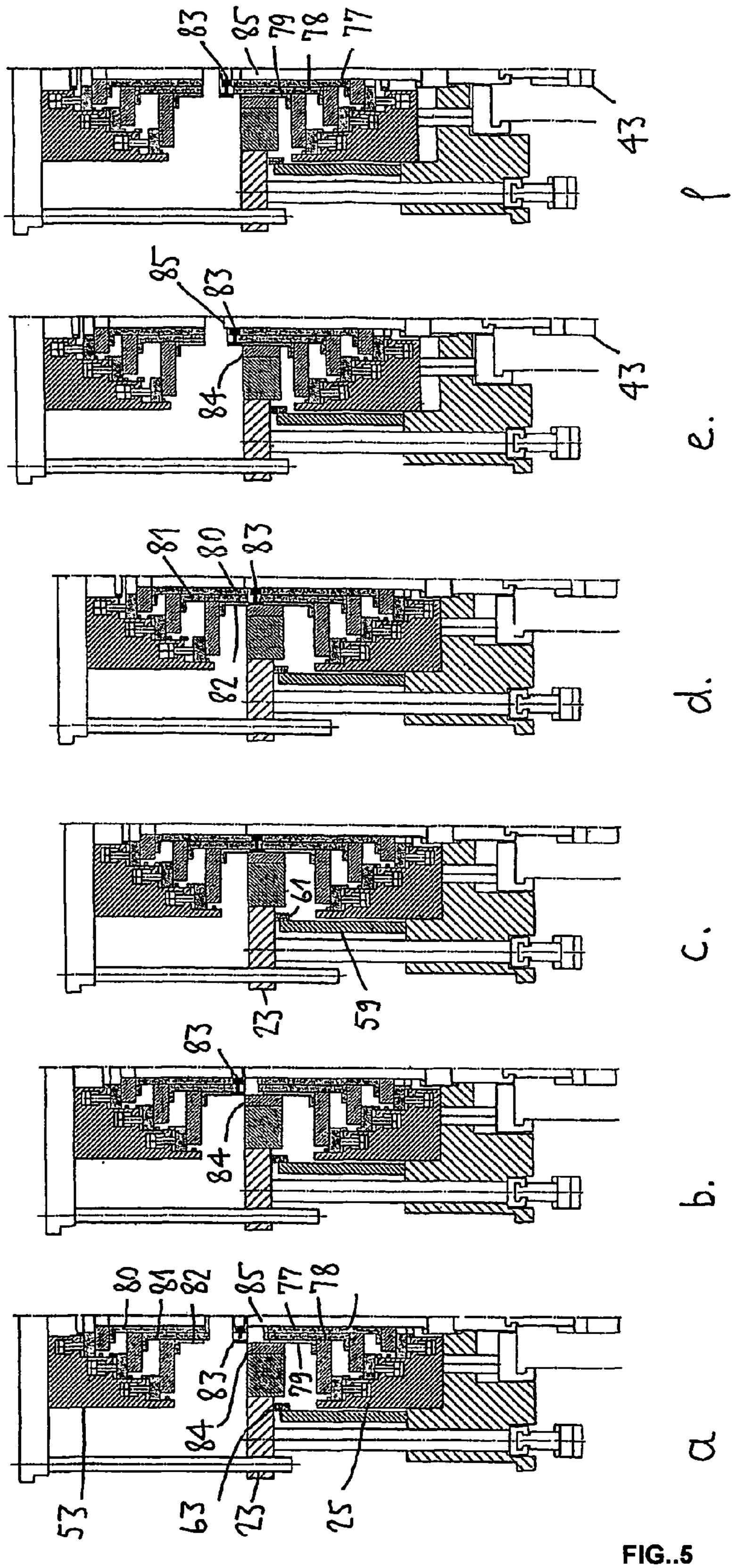
FIG..5

DEVICE TO RECEIVE TOOLS FOR THE CALIBRATION OF WORKPIECES AND PRESS WITH SUCH A DEVICE

This application is the US national phase of international application PCT/CH2004/000650 filed 28 Oct. 2004, which designated the U.S. and claims priority to CH 1841/03 filed 29 Oct. 2003, the entire contents of each of which are hereby incorporated by reference.

The invention concerns a device to receive tools for the calibration of workpieces, in particular workpieces manufactured by a powder metallurgical process.

In powder metallurgical manufacturing of workpieces metallic powder or granulate is first compacted in a die. The object obtained in this way is then sintered in a oven. The workpieces manufactured in this way often do not have the desired dimensional accuracy and quality of the surfaces. In order to improve the dimensional accuracy and the quality of the surfaces it is known to subject the workpieces to a further operation, namely to the so-called calibration. For this purpose the workpiece is placed in a die and subjected to high pressure which may be in the order of 60 KN per $cm^2$. In this way the structure of the workpiece is compacted. Also the quality of the surfaces and the dimensional accuracy will be increased. Up to the present time calibrating was carried out with relatively simple devices. However, in practice these devices are not sufficiently modular and flexible for use with complicated workpieces.

In the patent literature no devices have been found for receiving tools for the calibration of workpieces. A utility patent under no. DE 90 12 752.8 from the year 1991 discloses an adapter for tools for the manufacturing of workpieces by compacting of metallic powder. However, in this publication no indication is found that this device could also be used for pressing a sintered, that is a solid workpiece, to compact its structure in order to improve its surface quality and to increase its dimensional accuracy. Compacting the structure, improving surface quality and increasing dimensional accuracy of sintered workpieces represents a different problem than the forming of an article of powdery material.

It is therefore an object of the present invention to create a device which is of modular design, flexible in application and capable to receive a plurality of stamps on different tool planes, so that also complicated workpieces, such as gears or gear segments, can be calibrated.

According to the invention this is accomplished by a device comprising a base plate for mounting on the table of a press, a lower coupling plate for attachment at the lower ram of the press, an upper coupling plate for attachment at the upper ram of the press, a die supporting plate located between the base plate and the upper coupling plate, a lower tool receiving unit connected to the lower coupling plate and movable as a whole with the corresponding tool supports, and an upper tool receiving unit connected to the upper coupling plate and movable as a whole with the corresponding tool supports, at least one of the tool receiving units comprising several tool supports and an actuating device provided for each tool support for individually moving the tool support back and forth. This device permits calibrating of relatively complicated workpieces as this will be illustrated below. This device allows to individually move the stamps of the tool during the pressing operation. However, on the subsequent ejecting operation all lower stamps will be moved together with the lower ram which permits to free the workpiece and its transfer to a transfer device.

The lower as well as the upper tool receiving unit preferably comprise several tool supports. However, if it is desired to employ the device for single use with a certain tool for calibrating very large numbers of a certain workpiece for which one part of the tool contains only one stamp eventually only one of both tool receiving units may be provided with several tool supports.

According to an embodiment of the invention the actuating devices for the tool supports are integrated into the tool receiving unit. In this case the calibration device is substantially independent of the design of the press. However, it is also possible to connect the tool supports to coupling rods which are actuatable by actuating devices of the press.

The device may contain a central tool support which is actuatable by an actuating device of the press. This central tool support serves to receive the central pin which can engage the central bore of the workpiece, if the workpiece contains such a bore.

The respective actuating device may be preferably hydraulically actuatable, for example by a hydraulic cylinder.

An embodiment of the device is characterised in that the die supporting plate is supported by rods which are axially movable in the base plate, and in that the upper position of each rod is limited by a stop. These rods may be connectable to hydraulic cylinders of the press. This device provides that the die supporting plate will be on the same level both on feeding and removing the workpiece. This facilitates automation of these operations. Another embodiment provides that between the base plate and the die supporting plate hydraulic cylinders are located. In both cases a so-called floating support of the die supporting plate is obtained. The die supporting plate is located at a small distance from a support member which encircles the lower tool receiving unit close to the center. Accordingly, if in calibrating the pressure acting on the die supporting plate exceeds a certain limit the die supporting plate comes to a rest on the support member. The central location of the support member has the advantage that the die supporting plate is not inadmissibly bent when the pressure is further increased. The support member is preferably provided with an adjustable stop, e.g. in form of a threaded ring, for the die supporting plate. On a tool change this permits to reduce the change over time, because no special spacers must be inserted. For each tool support an adjustable stop for the press position and for the ejecting position may be provided. However, it is also possible to provide a measuring system instead of a stop for the ejecting position. Such a measuring system may be located in the device itself or in the press. Also these features limit the time necessary for a tool change.

The invention also concerns a press for calibrating workpieces with a device according to one of the claims 1 to 15. A preferred embodiment of the press is characterised in that the die supporting plate is supported by rods which are axially movable in the base plate, the upper position of each rod being limited by a stop, and each rod being movable by a hydraulic cylinder. Advantageously also a central tool support is provided which may be actuatable, preferably hydraulically, by an actuating device located in the lower ram of the press. Embodiments of the invention will now be described with the reference to the drawing.

FIG. 1 shows a longitudinal section through the device,

FIG. 2 shows the device as in FIG. 1, but with inserted tools and a workpiece located on the die, FIG. 3 shows a modified version of the device, FIG. 4 shows a further modification of the device, and FIG. 5 illustrates the different steps of the calibration operation.

In order to better represent the inventive features the figures have been somewhat schematised.

As FIGS. 1 and 2 show, the device comprises a base plate 11, for example of square configuration, for mounting on the table 13 of a press, a lower coupling plate 15 to be mounted on the injection piston or on the lower ram 17 of the press, an upper coupling plate 19 for mounting at the upper ram 21 of the press, and a die supporting plate 23 located in the space between the base plate 11 and the upper coupling plate 19.

A lower tool receiving unit 25 is connected with four rods 27 to the coupling plate 15. An upper tool receiving unit 29 is connected with the upper coupling plate 90. The lower tool receiving unit 25 comprises three tool supports 31,32,33 which may be individually or together moved back and forward by actuating devices, e.g. hydraulic cylinders 37,38,39 parallel to the central axis 40. On the embodiment shown the actuating devices 37,38,39 are integrated in the tool receiving unit. The tool supports 31,32,33 are in the form of rings. Several hydraulic cylinders located at equal distances are provided for each tool support.

Further, a central tool support 41 is provided, which is actuatable by an actuating device 43, e.g. a hydraulic cylinder, of the press. For each tool support an adjustable stop 45,46,47 for the press position is provided. Also for the ejecting position an adjustable stop 49,50,51 is provided. The adjustable stops may be in the form of threaded rings.

In the embodiment shown the upper tool receiving unit 29 is of analogous design as the lower tool receiving unit 25, so that in this respect reference may be had to the lower tool receiving unit 25. For the corresponding parts the same reference numerals are used, but provided with an apostrophe. It is obvious for the man skilled in the art that it is possible to provide the tool receiving units 25, 29 with more or less tool supports.

The supporting plate 23 may be supported by four rods 55 which are axially movable in the base plate 11. The rods 55 may be coupled by coupling members 57 to the hydraulic cylinders 58 of the press. The coupling members 57 also act as stops limiting the upper position of the rods 55 and of the die supporting plate 23, respectively. As FIGS. 3 and 4 show, it is also possible to provide the hydraulic cylinders 58 at the device instead at the press.

A support member 59 with an adjustable stop 61 encircles the lower tool receiving unit 25 close to the center. Between the stop 61 and the die supporting plate 23 is a small gap 63. When during the calibrating operation the pressure on the die 84 reaches a certain value the die supporting plate 23 comes to a rest on the stop 61. The adjustable stop 61 can have the form of a threaded ring.

Four guide columns 65 extending from the upper coupling plate 19 into bores 67 of the die supporting plate 23 serve to guide the upper tool receiving unit 29 on its movement relative to the lower tool receiving unit 25.

FIG. 2 shows the device of FIG. 1 with the tool and a workpiece 83 inserted. The tool shown comprises the die 84 and the lower and upper stamps 77,78,79; 80,81,82, and the center pin 85.

As the embodiments according to FIGS. 3 and 4 show a measuring system 69,70,71 and 69',70'71', respectively, can be provided for positioning each tool support 31,32,33; 31', 32',33' into the ejecting position. In this case no adjustable stop is necessary for the ejecting position.

On the embodiment of FIG. 4 it can be seen that each tool support 31',32',33' is connected to a coupling rod 73,74,75, respectively, which can be actuated by actuating devices, e.g. hydraulic cylinders 37',38',39' of the press.

It is obvious for the man-skilled in the art that different features shown in the FIGS. 1 to 4 can be differently combined. For example, also on the device of FIG. 2 the hydraulic cylinders 37',38',39' can be located at the press as in FIG. 4.

In FIG. 5 the calibrating operation with a device according to FIGS. 1 and 2 is shown. A tool has been inserted into the device. The lower part of the tool comprises the stamps 77,78, 79 and the upper part the stamps 80,81,82. In addition a center pin 85 is provided. Also the workpiece 83 is shown. It has the form of a body of rotation.

The following phases of the calibrating operation are shown:

a) All-stamps are in base position. The die supporting plate 23 with the die 84 is in the upper position with a gap 63 being visible. The workpiece 83 to be calibrated is put on the die 84.

b) The upper tool is moving downward and pushes the workpiece 83 into the die 84.

c) The workpiece 83 is now under high pressure in press position and the floating die supporting plate 23 abuts on the stop 61 of the support member 59.

d) The upper tool is moved upward. On this example the stamps 80,82 make it possible for the stamp 81 located in between to withdraw from the groove of the workpiece 83.

e) The calibrated workpiece 83 is ejected from the die 84. All stamps 77,78,79, the center pin 85 included, are moved upward by the hydraulic cylinder 43.

f) The center pin 85 is pulled down and the inner most stamp 77 ejects on this example the workpiece. The calibrated workpiece 83 is now free.

Summarizing the following can be noted:

The device serves to receive a tool for calibrating of workpieces 83, preferably workpieces manufactured by a powder metallurgical process. On the example shown the tool comprises the lower stamps 77,78,79 and the upper stamps 80,81, 82 located on tool supports 31,32,33; 31',32',33'. These stamps may be moved up and down individually or together parallel to the axis 40. Also movable up and down is the tool support 41 on which, if required, a center pin 85 is mounted. The device is particularly suitable for the calibration of complicated workpieces, such as represented for example by the workpiece 83 having the form of a body of rotation.

The invention claimed is:

1. Device to receive tools for the calibration of workpieces, in particular workpieces manufactured by a powder metallurgical process, comprising a base plate for mounting on the table of a press, a lower coupling plate for attachment at the lower ram of the press, an upper coupling plate for attachment at the upper ram of the press, a die supporting plate located between the base plate and the upper coupling plate, a lower tool receiving unit connected to the lower coupling plate and movable as a whole with the corresponding tool supports, and an upper tool receiving unit connected to the upper coupling plate and movable as a whole with the corresponding tool supports, at least one of the tool receiving units comprising several tool supports and an actuating device provided for each tool support for individually moving the tool support back and forth.

2. Device as claimed in claim 1, characterised in that the lower tool receiving unit comprises several tool supports.

3. Device as claimed in claim 1, characterised in that the upper tool receiving unit comprises several tool supports.

4. Device as claimed in claim 1, characterised in that the actuating device is integrated into the tool receiving unit.

5. Device as claimed in claim 1, characterised in that the tool supports are connected to coupling rods actuatable by actuating devices of the press.

6. Device as claimed in claim 1, characterised in that a central tool support is provided which is actuatable by an actuating device of the press.

7. Device as claimed in claim 1, characterised in that the respective actuating device is hydraulically actuatable.

8. Device as claimed in claim 1, characterised in that the supporting plate is supported by rods which are axially movable in the base plate, and in that the upper position of each rod is limited by a stop.

9. Device as claimed in claim 8, characterised in that the rods are movable by hydraulic cylinders of the press.

10. Device as claimed in claim 1, characterised in that between the base plate and the die supporting plate hydraulic cylinders are located.

11. Device as claimed in claim 1, characterised in that a support member for the die supporting plate encircles the lower tool receiving unit close to the center.

12. Device as claimed in claim 11, characterised in that at the support member an adjustable stop, e.g. in the form of a threaded ring, for the die supporting plate is located.

13. Device as claimed in claim 1, characterised in that for each tool support an adjustable stop for the press position is provided.

14. Device as claimed in claim 1, characterised in that for each tool support an adjustable stop for the ejecting position is provided.

15. Device as claimed in claim 1, characterised in that for the positioning of each tool support into ejecting position a measuring system is provided.

16. Press for calibrating workpieces, in particular workpieces manufactured by a powder metallurgical process, with a device according to claim 1.

17. Press according to claim 16, characterised in that the die supporting plate is supported by rods which are axially movable in the base plate, the upper position of each rod being limited by a stop, and each rod being movable by a hydraulic cylinder.

18. Press according to claim 16, characterised in that a central tool support is provided, and in that said central tool support is movable, preferably hydraulically, by an actuating device located in the lower ram of the press.

* * * * *